(12) United States Patent
Hiraoka et al.

(10) Patent No.: US 6,514,442 B1
(45) Date of Patent: Feb. 4, 2003

(54) METHOD AND APPARATUS FOR ADJUSTING ZERO POINT OF A PRESSURE SENSOR OF AN INJECTION APPARATUS

(75) Inventors: Kazuo Hiraoka, Chiba (JP); Yoshiyuki Imatomi, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 370 days.

(21) Appl. No.: 09/625,313

(22) Filed: Jul. 25, 2000

(30) Foreign Application Priority Data

Jul. 30, 1999 (JP) .......................... 11-217102

(51) Int. Cl.$^7$ .......................... B29C 45/77; G01L 19/02
(52) U.S. Cl. .................... 264/40.1; 264/40.5; 425/149; 73/1.62
(58) Field of Search ............................. 264/40.1, 40.5, 264/40.7, 328.1; 425/145, 146, 149, 170; 73/1.57, 1.62

(56) References Cited

U.S. PATENT DOCUMENTS

| | | | |
|---|---|---|---|
| 3,863,165 A | | 1/1975 | Egawa et al. |
| 4,849,678 A | * | 7/1989 | Kamiguchi et al. ........ 264/40.1 |
| 5,494,427 A | * | 2/1996 | Arai .......................... 264/40.7 |
| 5,553,481 A | | 9/1996 | Arai |
| 5,567,367 A | | 10/1996 | Ito et al. |
| 5,997,780 A | * | 12/1999 | Ito et al. .................. 264/328.1 |
| 6,244,848 B1 | * | 6/2001 | Ito .............................. 425/149 |
| 6,321,940 B1 | * | 11/2001 | Imatomi et al. .......... 222/146.2 |
| 2001/0020382 A1 | * | 9/2001 | Usui et al. .................... 73/1.57 |
| 2001/0042934 A1 | * | 11/2001 | Usui et al. ................. 264/40.5 |

FOREIGN PATENT DOCUMENTS

| | | |
|---|---|---|
| EP | 0 806 277 A1 | 11/1997 |
| EP | 0 965 431 A2 | 12/1999 |
| EP | 1 077 123 A2 | 2/2001 |

OTHER PUBLICATIONS

Patent Abstracts of Japan, Publication No. 02088209, Publication Date: Mar. 28, 1990.
Abstract of Japanese Patent Publication No. 07–125033; dated May 16, 1995.
Abstract of Japanese Patent Publication No. JP3221428; dated Sep. 30, 1991.

* cited by examiner

Primary Examiner—Jill L. Heitbrink
(74) Attorney, Agent, or Firm—Squire, Sanders & Dempsey LLP

(57) ABSTRACT

A method and apparatus for adjusting a zero point of a pressure sensor of an injection apparatus, which method and apparatus enable precise zero-point adjustment for the pressure sensor. Pressure of resin is detected by use of the pressure sensor, while a screw is moved, and a detection value corresponding to a detected pressure is obtained. The zero point of the pressure sensor is adjusted on the basis of the detection value. The detection value is obtained when the screw is moved in a state in which a flight speed is rendered lower than a screw speed. In this case, since the frictional resistance which acts on resin in the vicinity of the inner circumferential surface of the heating cylinder upon movement of the screw can be decreased, loads stemming from the frictional resistance are prevented from serving as disturbance against the detection value. As a result, zero-point adjustment for the pressure sensor can be performed precisely.

8 Claims, 6 Drawing Sheets

METHOD AND APPARATUS FOR ADJUSTING ZERO POINT OF A PRESSURE SENSOR OF AN INJECTION APPARATUS

BACKGROUND OF THE INVENTION

1. Field of the Invention

The present invention relates to a method and apparatus for adjusting a zero point of a pressure sensor of an injection apparatus.

2. Description of the Related Art

Conventionally, an injection apparatus is disposed in an injection molding machine. A screw is disposed within a heating cylinder of the injection apparatus such that the screw can be rotated and reciprocated by drive means. A spiral flight is formed on the outer circumferential surface of the body of the screw; i.e., the screw body, so that a groove is formed by the flight.

When the screw is rotated in a forward direction during a metering step, pellets of resin which have fallen from a hopper attached to the heating cylinder are melted within the heating cylinder, and molten resin is caused to advance along the groove. As a result, the screw is retracted, and the molten resin is accumulated on the front side of a screw head. When the screw is advanced during an injection step, the resin accumulated in front of the screw head is injected from an injection nozzle and charged into a cavity of a mold unit. Incidentally, in the case in which the outer circumferential surface of the screw and the inner circumferential surface of the heating cylinder are of equal surface roughness, when the screw is rotated during the metering step, the resin within the groove rotates together with the screw and does not advance. Therefore, in general, the inner circumferential surface of the heating cylinder is made rougher than the outer circumferential surface of the screw.

When speed control or pressure control is performed during the injection step, pressure of resin is detected by use of a pressure sensor such as a load cell, and the detected pressure is used for feedback control.

Such pressure detection involves a problem as follows. In the course of manufacture of an injection apparatus, a load cell is built into the injection apparatus such that a value output from the load cell (i.e., a detection value) indicates zero. However, since mechanical resistance of the injection apparatus and frictional resistance associated with resin produce loads which act on the load cell, the actual resin pressure is not zero, resulting that the detection value indicates a pressure differing from the actual resin pressure. In order to solve this problem, an operation of adjusting the zero point of the load cell is performed.

Figure 1:
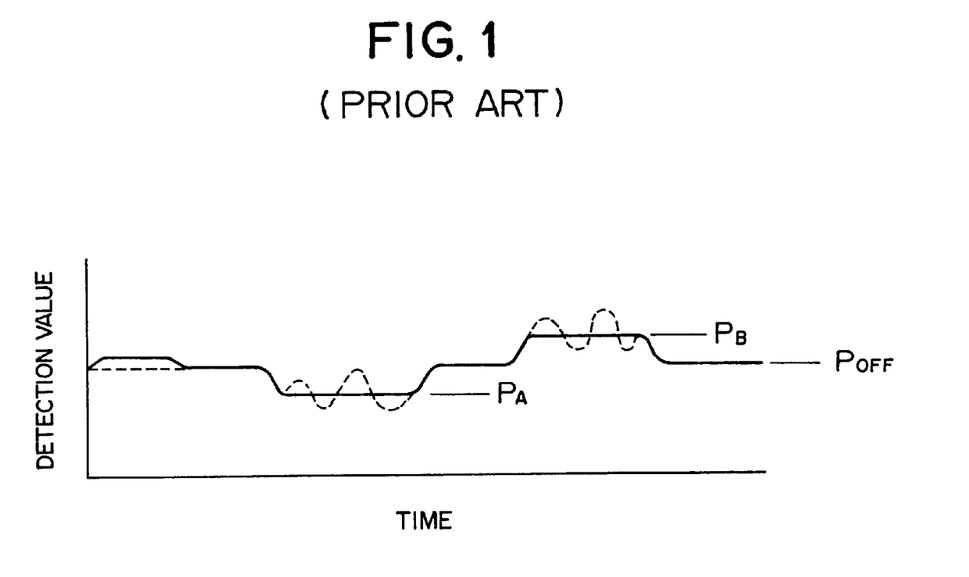
FIG. 1 is a chart used for description of the principle of a conventional operation for adjusting the zero point of a load cell.

FIG. 1 is a chart used for description of the principle of a conventional operation for adjusting the zero point of a load cell. In FIG. 1, the horizontal axis represents time, and the vertical axis represents detection value.

First, a screw is retracted at a predetermined speed from a predetermined position; e.g., a position at which a metering step has been completed (hereinafter referred to as a "metering completed position"), and a detection value $P_A$ output from the load cell during the retraction movement is detected. Subsequently, the screw is advanced at a speed equal to the predetermined speed, and a detection value $P_B$ output from the load cell during the advance movement is detected. A mean value $P_{OFF}$ of the detection values $P_A$ and $P_B$ expressed by the following equation assumes a value which is not affected by mechanical resistance or frictional resistance associated with resin.

$$P_{OFF} = (P_A + P_B)/2$$

In an injection step, pressure of resin is detected by use of the load cell, while the mean value $P_{OFF}$ regarded as a zero point, is subtracted from a detected pressure value, whereby actual resin pressure can be detected.

However, in the conventional injection apparatus, since the inner circumferential surface of the heating cylinder is made rougher than the outer circumferential surface of the screw, when the screw is advanced or retracted, a large frictional resistance acts on resin in the vicinity of the inner circumferential surface of the heating cylinder. Thus, as indicated by broken lines in FIG. 1, the detection values $P_A$ and $P_B$ change due to loads stemming from the frictional resistance and serving as disturbance. As a result, the mean value $P_{OFF}$ involves variation, which renders performance of precise zero-point adjustment for the load cell impossible.

SUMMARY OF THE INVENTION

An object of the present invention is to solve the above-mentioned problem in the conventional injection apparatus, and to provide a method and apparatus for adjusting a zero point of a pressure sensor of an injection apparatus, which method and apparatus enable precise zero-point adjustment for the pressure sensor.

In order to achieve the above object, the present invention provides a method of adjusting a zero point of a pressure sensor of an injection apparatus, the method comprising the steps of: detecting pressure of resin by use of the pressure sensor, while moving a screw, in order to obtain a detection value corresponding to a detected pressure; and adjusting the zero point of the pressure sensor on the basis of the detection value.

The detection value is obtained when the screw is moved in a state in which a flight speed is rendered lower than a screw speed.

In this case, since the frictional resistance which acts on resin in the vicinity of the inner circumferential surface of the heating cylinder upon movement of the screw can be decreased, loads stemming from the frictional resistance are prevented from serving as disturbance against the detection value. As a result, zero-point adjustment for the pressure sensor can be performed precisely.

Preferably, the screw is advanced or retracted in a first stage, and is moved in the opposite direction in a second stage.

More preferably, the screw speed in the first stage is made equal to that in the second stage.

In this case, since the injection apparatus can be operated under the same conditions in the first and second stages, the zero-point adjustment for the pressure sensor can be performed precisely.

BRIEF DESCRIPTION OF THE DRAWINGS

The structure and features of a method and apparatus for adjusting a zero point of a pressure sensor of an injection apparatus according to the present invention will be readily appreciated as the same becomes better understood by reference to the accompanying drawings, in which.

DESCRIPTION OF PREFERRED EMBODIMENT

An embodiment of the present invention will next be described in detail with reference to the drawings.

Figure 2:
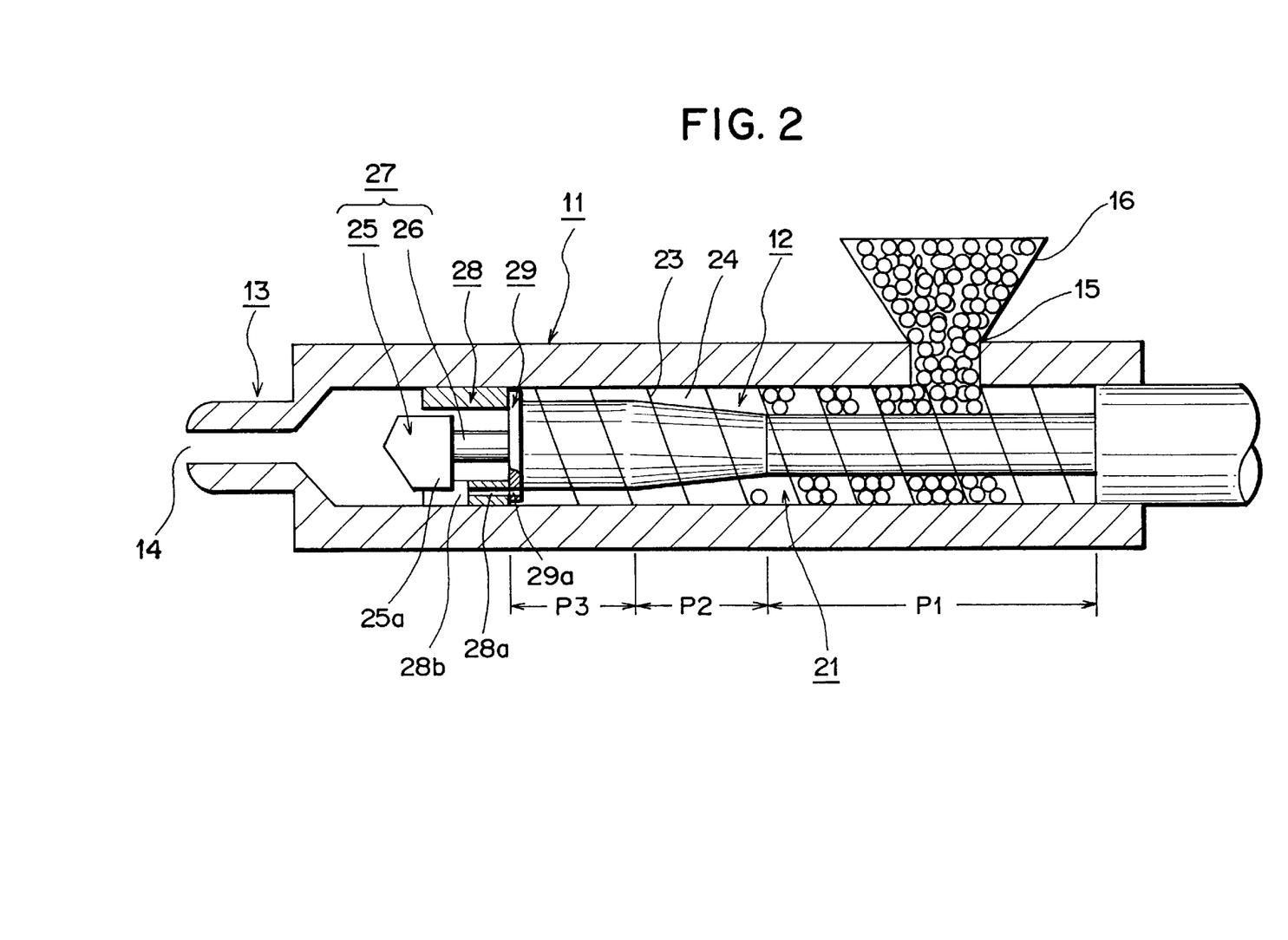
FIG. 2 is an enlarged sectional view of a main portion of an injection apparatus according to an embodiment of the present invention.
Figure 3:
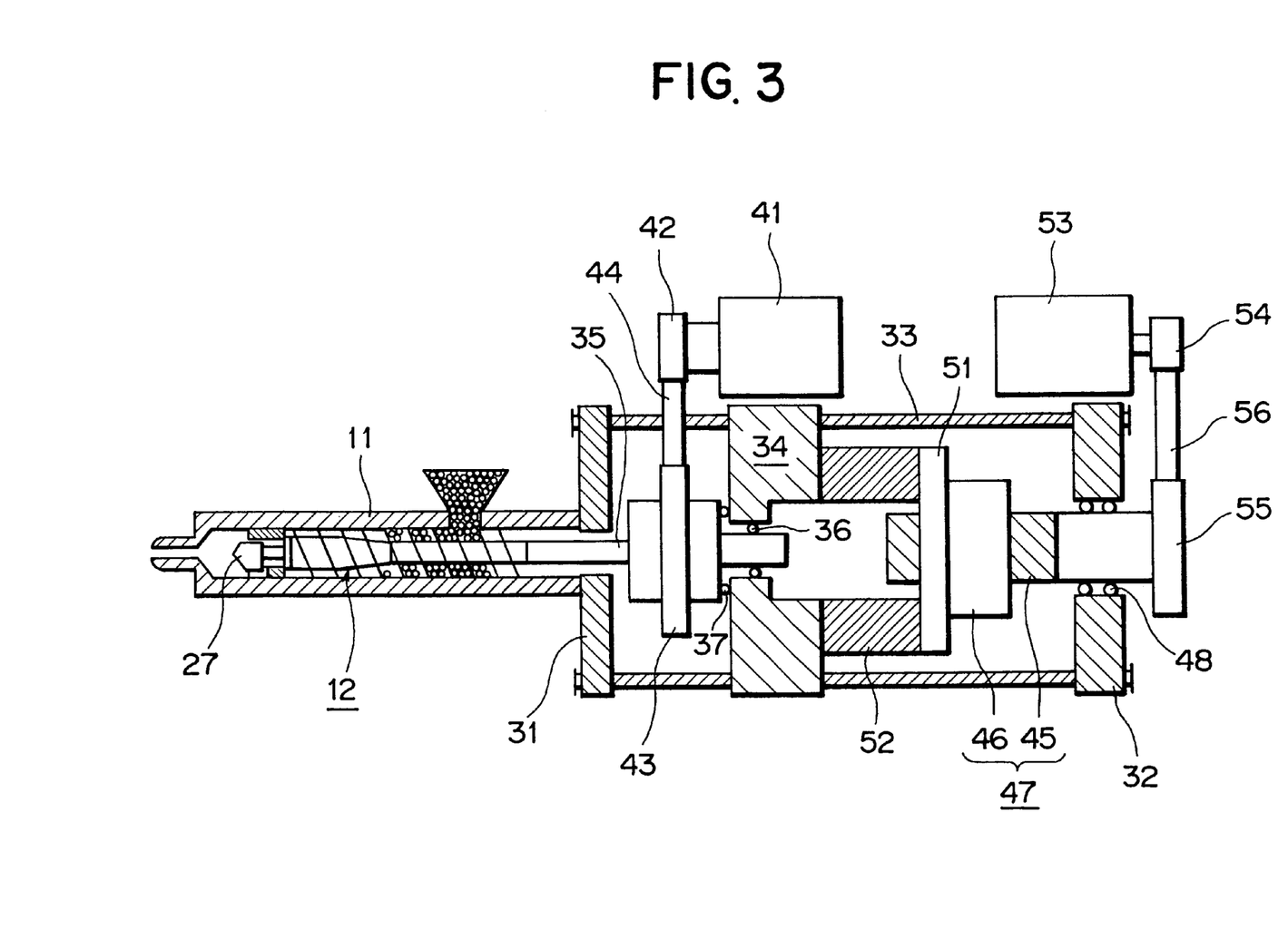
FIG. 3 is a schematic view of the injection apparatus according to the embodiment of the present invention.
Figure 4:
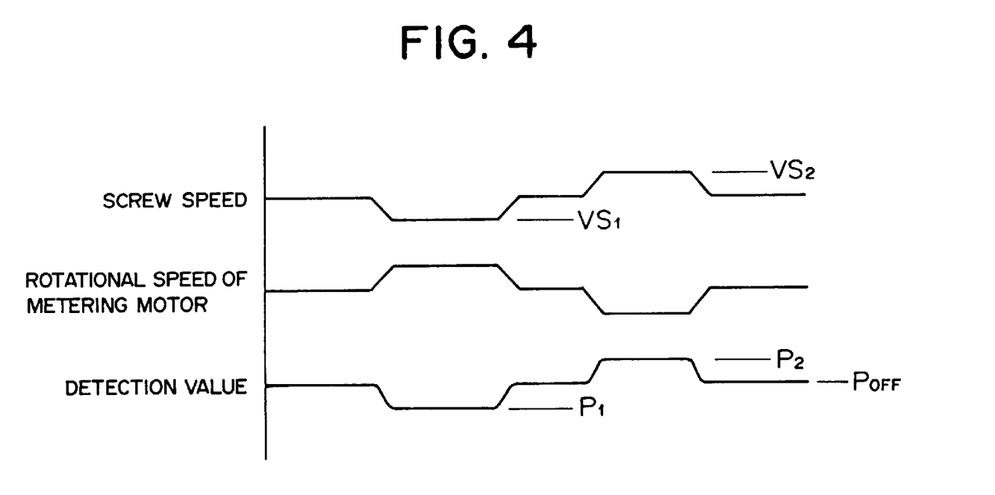
FIG. 4 is a time chart showing operation of the injection apparatus according to the embodiment of the present invention.

FIG. 2 is an enlarged sectional view of a main portion of an injection apparatus according to the embodiment of the present invention; FIG. 3 is a schematic view of the injection apparatus according to the embodiment of the present invention; and FIG. 4 is a time chart showing operation of the injection apparatus according to the embodiment of the present invention.

In FIGS. 2 and 3, reference numeral 11 denotes a heating cylinder serving as a cylinder member; reference numeral 12 denotes a screw which is disposed within the heating cylinder 11 such that the screw 12 can be rotated and can be reciprocated and which serves as an injection member; reference numeral 13 denotes an injection nozzle formed at the front end (the left end in FIG. 2) of the heating cylinder 11; reference numeral 14 denotes a nozzle opening formed in the injection nozzle 13; reference numeral 15 denotes a resin supply port formed in the heating cylinder 11 at a predetermined position in the vicinity of the rear end (the right end in FIG. 2) of the heating cylinder 11; and reference numeral 16 denotes a hopper attached to the resin supply port 15 and adapted to accommodate pellets of resin.

The screw 12 has a flight portion 21 and a screw head 27 disposed at the front end of the flight portion 21. The flight portion 21 includes a spiral flight 23 formed on the outer circumferential surface of the screw body, so that a spiral groove 24 is formed by the flight 23. In the flight portion 21, a resin supply section P1 to which pellets of resin are supplied from the hopper 16, a compression section P2 in which the supplied resin is melted while being compressed, and a metering section P3 in which a predetermined amount of the molten resin is measured are formed, in this order from the rear side (the right side in FIG. 2) toward the front side (the left side in FIG. 2). The resin in the groove 24 assumes the form of pellets in the resin supply section P1 as shown in FIG. 2, comes into a semi-molten state in the compression section P2, and is melted completely into liquid in the metering section P3.

The diameter of the screw 12 measured at the bottom of the groove 24 is set to a relatively small value in the resin supply section P1, and is increased gradually from the rear side toward the front side in the compression section P2, so that the diameter becomes relatively large in the metering section P3. Therefore, the clearance between the inner circumferential surface of the heating cylinder 11 and the bottom of the groove 24 of the screw 12 is relatively large in the resin supply section P1, and decreases gradually from the rear side toward the front side in the compression section P2, so that the clearance becomes relatively small in the metering section P3.

When the screw 12 is rotated in a forward direction during a metering step, pellets of resin are supplied from the hopper 16 to the resin supply section P1, and molten resin is caused to advance (moved to the left in FIG. 2) along the groove 24. As a result, the screw 12 retracts (moves to the right in FIG. 2), and the molten resin is accumulated on the front side of the screw head 27. When the screw 12 is advanced during an injection step, the resin accumulated in front of the screw head 27 is injected from the injection nozzle 13 and charged into a cavity of an unillustrated mold unit. In the case in which the outer circumferential surface of the screw 12 and the inner circumferential surface of the heating cylinder 11 are of equal surface roughness, when the screw 12 is rotated during the metering step, the resin within the groove 24 rotates together with the screw 12 and does not advance. In order to avoid this problem, the inner circumferential surface of the heating cylinder 11 is made rougher than the outer circumferential surface of the screw 12.

In order to prevent backflow of the resin accumulated in front of the screw head 27, a backflow prevention unit is provided. Specifically, the screw head 27 has a conical head body 25 at its front side (left side in FIG. 2) and a shaft portion 26 at its rear side (right side in FIG. 2). An annular backflow prevention ring 28 is rotatably disposed to surround the shaft portion 26, and a press metal plate 29 is fixed to the front end of the flight portion 21. The backflow prevention ring 28 and the press metal plate 29 constitute the backflow prevention unit.

An axially-extending hole 28a is formed in the backflow prevention ring 28 at a plurality of positions in the circumferential direction; and a cutaway 28b is formed at the front end of the backflow prevention ring 28 to extend over a predetermined angle. An engagement projection 25a formed on the head body 25 is received in the cutaway 28b. By virtue of this structure, when the screw 12 rotates, the backflow prevention ring 28 rotates over a predetermined angle θ relative to the screw head 27 and is restricted from rotating further.

Meanwhile, an axially-extending hole 29a is formed in the press metal plate 29 at a plurality of circumferential positions corresponding to those of the holes 28a. Accordingly, when the backflow prevention ring 28 rotates by the predetermined angle θ relative to the screw head 27, communication between the holes 28a and 29a is established selectively. During the metering step, as shown in FIG. 2, the backflow prevention ring 28 is positioned at a communication position in which the space on the front side of the screw head 27 communicates with the flight portion 21, and during the injection step, the backflow prevention ring 28 is positioned at a shut-off position in which the communication between the space on the front side of the screw head 27 and the flight portion 21 is broken.

The rear end (right end in FIG. 3) of the heating cylinder 11 is fixed to a front injection support 31, and a rear injection support 32 is disposed to be separated a predetermined distance from the front injection support 31. Guide bars 33 are disposed and extend between the front injection support 31 and the rear injection support 32, and a pressure plate 34 is disposed such that the pressure plate 34 can advance and retract (move leftward and rightward in FIG. 3) along the guide bars 33. The front injection support 31 and the rear injection support 32 are fixed to an unillustrated slide base by use of unillustrated bolts.

A drive shaft 35 is connected to the rear end of the screw 12, and the drive shaft 35 is rotatably supported by the pressure plate 34 via bearings 36 and 37. In order to rotate the screw 12, a metering motor (electric motor) 41 is disposed as first drive means; and first rotation transmission means composed of pulleys 42 and 43 and a timing belt 44 is disposed between the metering motor 41 and the drive shaft 35. Therefore, the screw 12 can be rotated forward and backward through drive of the metering motor 41. In the present embodiment, the electric metering motor 41 is used as the first drive means. However, in place of the electric metering motor 41, a hydraulic motor may be used.

A ball screw 47, which is composed of a ball screw shaft 45 and a ball nut 46 in mutual screw-engagement, is disposed on the rear side (on the right side in FIG. 3) of the pressure plate 34. The ball screw 47 serves as motion conversion means for converting rotational motion to linear motion. The ball screw shaft 45 is rotatably supported by the rear injection support 32 via a bearing 48, and the ball nut 46 is fixed to the pressure plate 34 via a plate 51 and a load cell 52, which is an example of a pressure sensor serving as load detection means. In order to reciprocate the screw 12, an injection motor 53 is disposed as second drive means; and second rotation transmission means composed of pulleys 54 and 55 and a timing belt 56 is disposed between the injection motor 53 and the ball screw shaft 45. Therefore, when the ball screw shaft 45 is rotated through drive of the injection motor 53, the ball nut 46 and the pressure plate 34 are moved, whereby the screw 12 is advanced (moved leftward in FIG. 3) and retracted (moved rightward in FIG. 3). In the present embodiment, the injection motor 53 is used as means for moving the pressure plate 34. However, in place of the injection motor 53, an injection cylinder may be used.

Resin pressure can be detected as a load by use of the load cell 52. However, since a pressure represented by a detection value output from the load cell 52 differs from the actual resin pressure, after the load cell 52 is built into the injection apparatus, the zero point of the load cell 52 is adjusted in two stages. Specifically, in the first stage of zero-point adjustment, as shown in FIG. 4, the screw 12 is moved in a first direction; e.g., is retracted, at a predetermined screw speed $VS_1$ from a predetermined position; e.g., a metering completed position, and a detection value $P_1$ output from the load cell 52 during the movement is detected. Subsequently, in the second stage, the screw 12 is moved in a second direction; e.g., is advanced at a screw speed $VS_2$ which may be equal to the screw speed $VS_1$, and a detection value $P_2$ output from the load cell 52 during the movement is detected. The screw speed $VS_1$ assumes a positive value in the retraction direction of the screw 12; and the screw speed $VS_2$ assumes a positive value in the advancement direction of the screw 12. A mean value $P_{OFF}$ of the detection values $P_1$ and $P_2$ expressed by the following equation assumes a value which is not affected by mechanical resistance or frictional resistance associated with resin.

$$P_{OFF}=(P_1+P_2)/2$$

In an injection step, pressure of resin is detected by use of the load cell, while the mean value $P_{OFF}$ regarded as a zero point, is subtracted from a detected pressure value, whereby actual resin pressure can be detected. In the present embodiment, the mean value $P_{OFF}$ is obtained through a calculation in which the sum of the detection values $P_1$ and $P_2$ is divided by two. However, the mean value $P_{OFF}$ may be calculated in accordance with a predetermined mathematical formula.

However, as described above, the inner circumferential surface of the heating cylinder 11 is made rougher than the outer circumferential surface of the screw 12. Therefore, when the screw 12 is advanced or retracted, a large frictional resistance acts on resin in the vicinity of the inner circumferential surface of the heating cylinder 11. Thus, the detection values $P_1$ and $P_2$ change due to loads stemming from the frictional resistance and serving as disturbance. As a result, the mean value $P_{OFF}$ involves variation, which renders performance of precise zero-point adjustment impossible.

In order to solve the above-described problem, when the screw 12 is retracted in the first stage, the screw 12 is rotated in a first direction; e.g., in the forward direction, through drive of the metering motor 41, such that the apparent speed of the flight 23 or the flight speed $Vf_1$ is set lower than the screw speed $VS_1$; i.e., is set to satisfy the following relation.

$$0 \leq Vf_1 < VS_1$$

When the screw 12 is advanced in the second stage, the screw 12 is rotated in a second direction; e.g., in the reverse direction, through drive of the metering motor 41 such that the flight speed $Vf_2$ is set lower than the screw speed $VS_2$; i.e., is set to satisfy the following relation.

$$0 \leq Vf_2 < VS_2$$

As a result, since the frictional resistance which acts on resin in the vicinity of the inner circumferential surface of the heating cylinder 11 upon movement of the screw 12 can be decreased, loads stemming from the frictional resistance is prevented from serving as disturbance against the detection values $P_1$ and $P_2$. Accordingly, variation in the mean value $P_{OFF}$ is prevented, so that the zero-point adjustment can be performed precisely.

When the zero-point adjustment for the load cell 52 is performed, the screw speed $VS_1$ at which the screw 12 is retracted is made equal to the screw speed $VS_2$ at which the screw 12 is advanced. Since the injection apparatus can be operated under the same conditions in the first and second stages, the zero-point adjustment can be performed precisely.

It is to be noted that when the screw 12 is retracted in the first stage, a space is formed in front of the screw 12, so that resistance of resin does not act on the screw 12. By contrast, if the screw 12 is advanced in the first stage, resistance of resin present in front of the screw 12 acts on the screw 12, and the detection value is disturbed.

A pressure-sensor zero-point adjustment apparatus is provided in order to render the flight speed $Vf_1$ lower than the screw speed $VS_1$ and the flight speed $Vf_2$ lower than the screw speed $VS_2$ in the above-described manner. The heating cylinder 11, the screw 12, the metering motor 41, the load cell 52, the injection motor 53, and a controller 62 constitute the pressure-sensor zero-point adjustment apparatus.

Next, a control circuit for the injection apparatus will be described.

Figure 5:
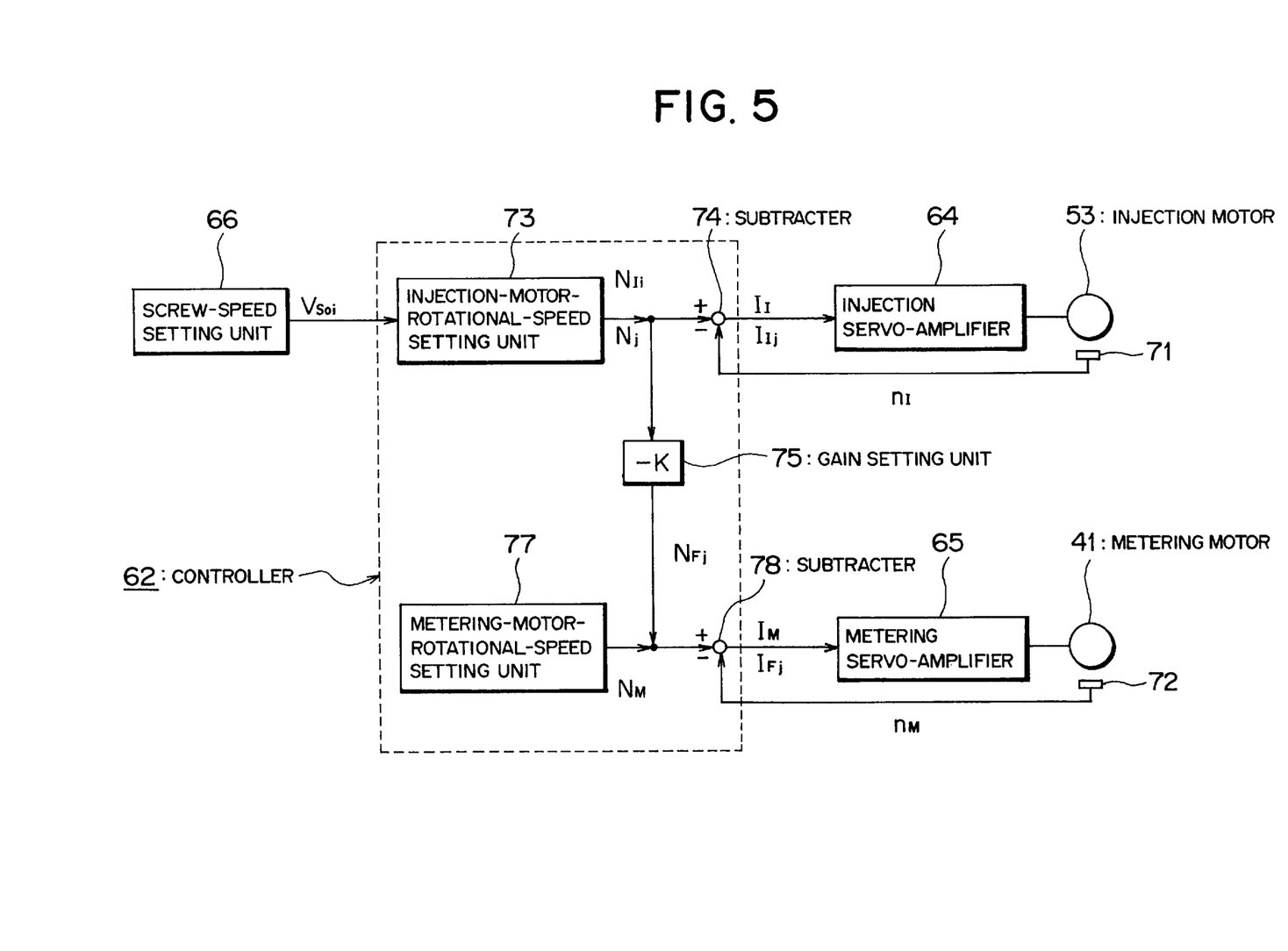
FIG. 5 is a block diagram of a main portion of a control circuit for the injection apparatus according to the embodiment of the present invention.
Figure 6:
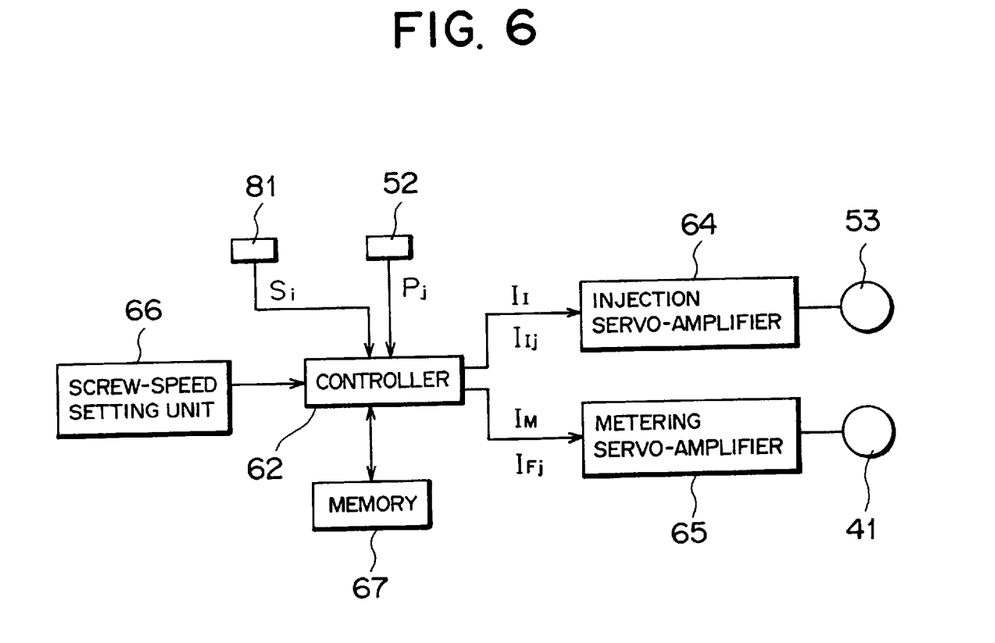
FIG. 6 is a control block diagram of the injection apparatus according to the embodiment of the present invention.

FIG. 5 is a block diagram of a main portion of a control circuit for the injection apparatus according to the embodiment of the present invention; and FIG. 6 is a control block diagram of the injection apparatus according to the embodiment of the present invention.

In FIGS. 5 and 6, reference numeral 41 denotes a metering motor; 52 denotes a load cell; 53 denotes an injection motor; 62 denotes a controller; 64 denotes an injection servo-amplifier; 65 denotes a metering servo-amplifier; 66 denotes a screw-speed setting unit serving as screw-speed setting means; 67 denotes a memory; 71 denotes an injection-motor-rotational-speed detector for detecting rotational speed $n_I$ of the injection motor 53; 72 denotes a meteringmotor-rotational-speed detector for detecting rotational speed $n_M$ of the metering motor 41; and 81 denotes a screw position detector for detecting the position of the screw 12 (FIG. 3). The controller 62 includes an injection-motor-rotational-speed setting unit 73, subtracters 74 and 78, a gain setting unit (−K) 75, and a metering-motor-rotational-speed setting unit 77.

During a metering step, the metering-motor-rotational-speed setting unit 77 supplies a preset metering-motor-rotational-speed command $N_M$ to the subtracter 78. The subtracter 78 receives the metering-motor-rotational-speed command $N_M$ and the metering-motor-rotational-speed $n_M$, calculates the deviation $\Delta n_M$ between the metering-motor-rotational-speed command $N_M$ and the metering-motor-rotational-speed $n_M$, and sends the deviation $\Delta n_M$ to the metering servo-amplifier 65 in the form of a current command $I_M$. In this manner, the controller 62 drives the metering motor 41.

After completion of the metering step, at the metering completed position, the injection-motor-rotational-speed setting unit 73 generates an injection-motor-rotational-speed command $N_j$ (j=1, 2), and sends the injection-motor-rotational-speed command $N_j$ to the subtracter 74 and the gain setting unit 75. The subtracter 74 receives the injection-motor-rotational-speed command $N_j$ and the injection-motor-rotational-speed $n_I$, calculates the deviation $\Delta n_{Ij}$ (j=1, 2) between the injection-motor-rotational-speed command $N_j$ and the injection-motor-rotational-speed $n_I$, and sends the deviation $\Delta n_{Ij}$ to the injection servo-amplifier 64 in the form of a current command $I_{Ij}$ (j=1, 2). In this manner, the controller 62 drives the injection motor 53 in order to retract the screw 12 at a screw speed $VS_j$ (j=1, 2).

Upon reception of the injection-motor-rotational-speed command $N_j$ supplied from the injection-motor-rotational-speed setting unit 73, the gain setting unit 75 calculates and generates a metering-motor-rotational-speed command $N_{Fj}$ (j=1, 2), and sends the metering-motor-rotational-speed command $N_{Fj}$ to the subtracter 78. The subtracter 78 receives the metering-motor-rotational-speed command $N_{Fj}$ and the metering-motor-rotational-speed $n_M$, calculates the deviation $\Delta n_{Fj}$ (j=1, 2) between the metering-motor-rotational-speed command $N_{Fj}$ and the metering-motor-rotational-speed $n_M$, and sends the deviation $\Delta n_{Fj}$ to the metering servo-amplifier 65 in the form of a current command $I_{Fj}$ (j=1, 2). In this manner, the screw 12 is rotated at a screw rotational speed $Nf_j$ (j=1, 2).

During this operation, the controller 62 reads a detection value $P_j$ (j=1, 2) by the load cell 52, calculates the mean value $P_{OFF}$ on the basis of the detection value $P_j$, and performs zero-point adjustment for the load cell 52.

In the present embodiment, the injection-motor-rotational-speed setting unit 73 generates an injection-motor-rotational-speed command $N_1$ for a period τ1 in the first stage at the metering completed position and then an injection-motor-rotational-speed command $N_2$ for a period τ2 in the second stage at the metering completed position.

Therefore, in the first stage, the subtracter 74 receives the injection-motor-rotational-speed command $N_1$ and the injection-motor-rotational-speed $n_I$, calculates the deviation $\Delta n_{I1}$ between the injection-motor-rotational-speed command $N_1$ and the injection-motor-rotational-speed $n_I$, and sends the deviation $\Delta n_{I1}$ to the injection servo-amplifier 64 in the form of a current command $I_{I1}$. Therefore, unillustrated screw advancement/retraction control means of the controller 62 drives the injection motor 53 in order to retract the screw 12 at a screw speed VS1.

Upon reception of the injection-motor-rotational-speed command $N_1$ supplied from the injection-motor-rotational-speed setting unit 73, the gain setting unit 75 calculates and generates a metering-motor-rotational-speed command $N_{F1}$, and sends the metering-motor-rotational-speed command $N_{F1}$ to the subtracter 78. The subtracter 78 receives the metering-motor-rotational-speed command $N_{F1}$ and the metering-motor-rotational-speed $n_M$, calculates the deviation $\Delta n_{F1}$ between the metering-motor-rotational-speed command $N_{F1}$ and the metering-motor-rotational-speed $n_M$, and sends the deviation $\Delta n_{F1}$ to the metering servo-amplifier 65 in the form of a current command $I_{F1}$. Therefore, unillustrated flight speed control means of the controller 62 rotates the screw 12 at a screw rotational speed $Nf_1$.

During this operation, the controller 62 reads a detection value $P_1$.

Subsequently, in the second stage, the subtracter 74 receives the injection-motor-rotational-speed command $N_2$ and the injection-motor-rotational-speed $n_I$, calculates the deviation $\Delta n_{I2}$ between the injection-motor-rotational-speed command $N_2$ and the injection-motor-rotational-speed $n_I$, and sends the deviation $\Delta n_{I2}$ to the injection servo-amplifier 64 in the form of a current command $I_{I2}$. Therefore, the above-described screw advancement/retraction control means of the controller 62 drives the injection motor 53 in order to advance the screw 12 at a screw speed $VS_2$.

Upon reception of the injection-motor-rotational-speed command $N_2$ supplied from the injection-motor-rotational-speed setting unit 73, the gain setting unit 75 calculates and generates a metering-motor-rotational-speed command $N_{F2}$, and sends the metering-motor-rotational-speed command $NF_2$ to the subtracter 78. The subtracter 78 receives the metering-motor-rotational-speed command $N_{F2}$ and the metering-motor-rotational-speed $n_M$, calculates the deviation $\Delta n_{F2}$ between the metering-motor-rotational-speed command $N_{F2}$ and the metering-motor-rotational-speed $n_M$, and sends the deviation $\Delta n_{F2}$ to the metering servo-amplifier 65 in the form of a current command $I_{F2}$. Therefore, the above-described flight speed control means of the controller 62 rotates the screw 12 at a screw rotational speed $Nf_2$.

During this operation, the controller 62 reads a detection value $P_2$, calculates the mean value $P_{OFF}$ on the basis of the detection values $P_1$ and $P_2$ and performs zero-point adjustment for the load cell 52.

In the present embodiment, the zero-point adjustment for the load cell 52 is performed at the time of completion of the metering step. However, the zero-point adjustment may be performed at any other time, such as the time when the power is turned on or the time when resin is exchanged.

In a subsequent injection step, the screw speed Vs is changed in multiple steps in accordance with the screw position $S_i$ (i=1, 2, . . . ). For this operation, the screw-speed setting unit 66 generates a screw speed command $Vs_{oi}$ (i=1, 2, . . . ) in accordance with the screw position $S_i$, and sends the screw speed command $Vs_{oi}$ to the injection-motor-rotational-speed setting unit 73. Upon reception of the screw speed command $Vs_{oi}$, the injection-motor-rotational-speed setting unit 73 generates an injection-motor-rotational-speed command $N_{Ii}$(i=1, 2, . . . ) in accordance with the screw speed command $Vs_{oi}$, and sends the injection-motor-rotational-speed command $N_{Ii}$ to the subtracter 74. The subtracter 74 receives the injection-motor-rotational-speed command $N_{Ii}$ and the injection-motor-rotational-speed $n_I$, calculates the deviation $\Delta n_I$ between the injection-motor-rotational-speed command $N_{Ii}$ and the injection-motor-rotational-speed $n_I$, and sends the deviation $\Delta n_I$ to the injection servo-amplifier 64 in the form of a current command $I_r$. In this manner, the controller 62 drives the injection motor 53 in order to advance the screw 12.

In this case, as the screw 12 is advanced, the resin accumulated on the front side of the screw head 27 generates a reaction force, by which the load cell 52 is pressed via the pressure plate 34 and the drive shaft 35. At this time, distortion of the load cell 52 is converted to an electric signal. On the basis of the electric signal, there is calculated an injection force which is required to push the screw 12 from its rear side at a predetermined pressure.

Subsequently, when the screw position $S_i$ detected by the screw position detector 81 reaches a predetermined value, the controller 62 changes its control mode from speed control to pressure control, and performs pressure holding control on the basis of the above-described injection force. Thus, the injection step is completed.

The present invention is not limited to the above-described embodiment. Numerous modifications and variations of the present invention are possible in light of the spirit of the present invention, and they are not excluded from the scope of the present invention.

What is claimed is:

1. A method of adjusting a zero point of a pressure sensor of an injection apparatus, the method comprising the steps of:

detecting pressure of resin by use of the pressure sensor, while moving a screw, in order to obtain a detection value corresponding to a detected pressure; and adjusting the zero point of the pressure sensor on the basis of the detection value, wherein the detection value is obtained when the screw is moved in a state in which a flight speed is rendered lower than a screw speed.

2. A method according to claim 1, wherein the screw is advanced or retracted in a first stage, and is moved in the opposite direction in a second stage.

3. A method according to claim 2, wherein the screw speed in the first stage is made equal to that in the second stage.

4. A method according to claim 2, wherein the flight speed is made lower than the screw speed in at least one of the first and second stages.

5. A method according to claim 1, wherein the flight speed is made lower than the screw speed when the screw is advanced.

6. A method according to claim 2, wherein the screw is retracted in the first stage.

7. A method according to claim 1, wherein the flight speed is made zero.

8. An apparatus for adjusting a zero point of a pressure sensor of an injection apparatus, comprising:

(a) a heating cylinder;

(b) a screw disposed within the heating cylinder to be rotatable and reciprocatable, the screw having a flight portion in which a flight is formed on an outer circumference of a screw body, and a screw head disposed at a front end of the flight portion;

(c) first drive means for rotating the screw;

(d) second drive means for advancing and retracting the screw;

(e) a pressure sensor for detecting pressure of resin while the screw is advanced and retracted;

(f) screw advancement/retraction control means for driving the second drive means in order to advance and retract the screw at a predetermined screw speed; and (g) flight speed control means for driving the first drive means, during advancement and retraction of the screw, in order to advance and retract the flight at a flight speed that is lower than the screw speed.

* * * * *